United States Patent
Soroushian et al.

(10) Patent No.: US 10,708,587 B2
(45) Date of Patent: *Jul. 7, 2020

(54) SYSTEMS AND METHODS FOR ENCODING ALTERNATIVE STREAMS OF VIDEO FOR PLAYBACK ON PLAYBACK DEVICES HAVING PREDETERMINED DISPLAY ASPECT RATIOS AND NETWORK CONNECTION MAXIMUM DATA RATES

(71) Applicant: DIVX, LLC, San Diego, CA (US)

(72) Inventors: Kourosh Soroushian, San Diego, CA (US); Auke Sjoerd van der Schaar, London (GB)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,068

(22) Filed: Oct. 25, 2016

(65) Prior Publication Data

US 2017/0041604 A1 Feb. 9, 2017

Related U.S. Application Data

(63) Continuation of application No. 14/464,146, filed on Aug. 20, 2014, now Pat. No. 9,510,031, which is a
(Continued)

(51) Int. Cl.
*H04N 19/115* (2014.01)
*H04N 5/85* (2006.01)
(Continued)

(52) U.S. Cl.
CPC ............ *H04N 19/115* (2014.11); *H04N 5/85* (2013.01); *H04N 9/80* (2013.01); *H04N 19/132* (2014.11);
(Continued)

(58) Field of Classification Search
CPC ............ H04N 9/80; H04N 21/234363; H04N 21/23439; H04N 5/85; H04N 19/172;
(Continued)

(56) References Cited

U.S. PATENT DOCUMENTS 3,919,474 A 11/1975 Benson
4,009,331 A 2/1977 Goldmark et al.
(Continued)

FOREIGN PATENT DOCUMENTS

AU 2010202963 A1 2/2012
CN 1221284 A 6/1999
(Continued)

OTHER PUBLICATIONS

International Preliminary Report on Patentability for International Application No. PCT/US2012/053223, Report dated Mar. 4, 2014, 7 pgs.
(Continued)

*Primary Examiner* — Loi H Tran
(74) *Attorney, Agent, or Firm* — KPPB LLP

(57) ABSTRACT

Systems and methods for adaptive bitrate streaming of alternative streams of video encoded at resolution and sample aspect ratio combinations and maximum bitrates in accordance with embodiments of the invention are disclosed. In one embodiment of the invention, a source encoder configured to encode a source video stream as a plurality of alternative streams of video for playback on a playback device includes a processor configured to receive multimedia content including source video data having a primary resolution, a primary sample aspect ratio, and a primary frame rate and to encode the source video data as alternative streams of video, where the resolution and sample aspect ratio of at least one of the alternative streams of video are selected to have an aspect ratio that is the same
(Continued)

as a predetermined display aspect ratio and at least one of the alternative streams is encoded at a maximum bitrate.

18 Claims, 6 Drawing Sheets

Related U.S. Application Data continuation of application No. 13/432,521, filed on Mar. 28, 2012, now Pat. No. 8,818,171.

(60) Provisional application No. 61/529,204, filed on Aug. 30, 2011.

(51) Int. Cl.

| | | |
|---|---|---|
| *H04N 19/172* | (2014.01) | |
| *H04N 19/132* | (2014.01) | |
| *H04N 19/136* | (2014.01) | |
| *H04N 19/154* | (2014.01) | |
| *H04N 19/164* | (2014.01) | |
| *H04N 19/85* | (2014.01) | |
| *H04N 21/2343* | (2011.01) | |
| *H04N 9/80* | (2006.01) | |
| *H04N 19/16* | (2014.01) | |

(52) U.S. Cl.
CPC ......... *H04N 19/136* (2014.11); *H04N 19/154* (2014.11); *H04N 19/16* (2014.11); *H04N 19/164* (2014.11); *H04N 19/172* (2014.11); *H04N 19/85* (2014.11); *H04N 21/23439* (2013.01); *H04N 21/234363* (2013.01)

(58) Field of Classification Search
CPC .. H04N 19/115; H04N 19/132; H04N 19/136; H04N 19/154; H04N 19/164; H04N 19/85; H04N 19/16
USPC ........................................................ 386/248
See application file for complete search history.

(56) References Cited

U.S. PATENT DOCUMENTS

| | | |
|---|---|---|
| 4,694,357 A | 9/1987 | Rahman et al. |
| 4,802,170 A | 1/1989 | Trottier |
| 4,964,069 A | 10/1990 | Ely |
| 4,974,260 A | 11/1990 | Rudak |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,487,167 A | 1/1996 | Dinallo et al. |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,583,652 A | 12/1996 | Ware |
| 5,627,936 A | 5/1997 | Prasad |
| 5,633,472 A | 5/1997 | DeWitt et al. |
| 5,642,171 A | 6/1997 | Baumgartner et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,719,786 A | 2/1998 | Nelson et al. |
| 5,745,643 A | 4/1998 | Mishina |
| 5,751,280 A | 5/1998 | Abbott |
| 5,763,800 A | 6/1998 | Rossum et al. |
| 5,765,164 A | 6/1998 | Prasad et al. |
| 5,794,018 A | 8/1998 | Vrvilo et al. |
| 5,822,524 A | 10/1998 | Chen et al. |
| 5,828,370 A | 10/1998 | Moeller et al. |
| 5,844,575 A | 12/1998 | Reid |
| 5,848,217 A | 12/1998 | Tsukagoshi et al. |
| 5,903,261 A | 5/1999 | Walsh et al. |
| 5,907,597 A | 5/1999 | Mark |
| 5,912,710 A | 6/1999 | Fujimoto |
| 5,956,729 A | 9/1999 | Goetz et al. |
| 5,959,690 A | 9/1999 | Toebes, VIII et al. |
| 6,005,621 A | 12/1999 | Linzer et al. |
| 6,031,622 A | 2/2000 | Ristow et al. |
| 6,046,778 A | 4/2000 | Nonomura et al. |
| 6,065,050 A | 5/2000 | DeMoney |
| 6,079,566 A | 6/2000 | Eleftheriadis et al. |
| 6,157,410 A | 12/2000 | Izumi et al. |
| 6,169,242 B1 | 1/2001 | Fay et al. |
| 6,195,388 B1 | 2/2001 | Choi et al. |
| 6,204,883 B1 | 3/2001 | Tsukagoshi |
| 6,246,803 B1 | 6/2001 | Gauch et al. |
| 6,308,005 B1 | 10/2001 | Ando et al. |
| 6,330,286 B1 | 12/2001 | Lyons et al. |
| 6,374,144 B1 | 4/2002 | Viviani et al. |
| 6,395,969 B1 | 5/2002 | Fuhrer |
| 6,430,354 B1 | 8/2002 | Watanabe |
| 6,481,012 B1 | 11/2002 | Gordon et al. |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,697,568 B1 | 2/2004 | Kaku |
| 6,725,281 B1 | 4/2004 | Zintel et al. |
| 6,807,306 B1 | 10/2004 | Girgensohn et al. |
| 6,819,394 B1 | 11/2004 | Nomura et al. |
| 6,856,997 B2 | 2/2005 | Lee et al. |
| 6,859,496 B1 | 2/2005 | Boroczky et al. |
| 6,917,652 B2 | 7/2005 | Lyu |
| 6,920,179 B1 | 7/2005 | Anand et al. |
| 6,944,621 B1 | 9/2005 | Collart |
| 6,944,629 B1 | 9/2005 | Shioi et al. |
| 6,956,901 B2 | 10/2005 | Boroczky et al. |
| 6,985,588 B1 | 1/2006 | Glick et al. |
| 6,988,144 B1 | 1/2006 | Luken et al. |
| 7,127,155 B2 | 10/2006 | Ando et al. |
| 7,209,892 B1 | 4/2007 | Galuten et al. |
| 7,237,061 B1 | 6/2007 | Boic |
| 7,242,772 B1 | 7/2007 | Tehranchi |
| 7,330,875 B1 | 2/2008 | Parasnis et al. |
| 7,340,528 B2 | 3/2008 | Noblecourt et al. |
| 7,356,245 B2 | 4/2008 | Belknap et al. |
| 7,366,788 B2 | 4/2008 | Jones et al. |
| 7,457,359 B2 | 11/2008 | Mabey et al. |
| 7,478,325 B2 | 1/2009 | Foehr |
| 7,493,018 B2 | 2/2009 | Kim |
| 7,499,938 B2 | 3/2009 | Collart |
| 7,728,878 B2 | 6/2010 | Yea et al. |
| 7,869,691 B2 | 1/2011 | Kelly et al. |
| 8,023,562 B2 | 9/2011 | Zheludkov et al. |
| 8,046,453 B2 | 10/2011 | Olaiya |
| 8,054,880 B2 | 11/2011 | Yu et al. |
| 8,225,061 B2 | 7/2012 | Greenebaum |
| 8,233,768 B2 | 7/2012 | Soroushian et al. |
| 8,249,168 B2 | 8/2012 | Graves |
| 8,270,473 B2 | 9/2012 | Chen et al. |
| 8,270,819 B2 | 9/2012 | Vannier |
| 8,289,338 B2 | 10/2012 | Priyadarshi et al. |
| 8,311,115 B2 | 11/2012 | Gu et al. |
| 8,321,556 B1 | 11/2012 | Chatterjee et al. |
| 8,386,621 B2 | 2/2013 | Park |
| 8,456,380 B2 | 6/2013 | Pagan |
| 8,472,792 B2 | 6/2013 | Butt et al. |
| RE45,052 E | 7/2014 | Li |
| 8,768,984 B2 | 7/2014 | Priddle et al. |
| 8,818,171 B2 | 8/2014 | Soroushian et al. |
| 8,832,297 B2 | 9/2014 | Soroushian et al. |
| 8,914,534 B2 | 12/2014 | Braness et al. |
| 9,021,119 B2 | 4/2015 | Van Der Schaar et al. |
| 9,025,659 B2 | 5/2015 | Soroushian et al. |
| 9,197,944 B2 | 11/2015 | Reisner |

(56) References Cited

U.S. PATENT DOCUMENTS

| | | |
|---|---|---|
| 9,350,990 B2 | 5/2016 | Orton-Jay et al. |
| 9,357,210 B2 | 5/2016 | Orton-Jay et al. |
| 9,467,708 B2 | 10/2016 | Soroushian et al. |
| 9,510,031 B2 | 11/2016 | Soroushian et al. |
| 9,571,827 B2 | 2/2017 | Su et al. |
| 9,661,049 B2 | 5/2017 | Gordon |
| 9,712,890 B2 | 7/2017 | Shivadas et al. |
| 9,955,195 B2 | 4/2018 | Soroushian |
| 10,148,989 B2 | 12/2018 | Amidei et al. |
| 10,595,070 B2 | 3/2020 | Amidei et al. |
| 10,645,429 B2 | 5/2020 | Soroushian |
| 2001/0030710 A1 | 10/2001 | Werner |
| 2002/0034252 A1 | 3/2002 | Owen et al. |
| 2002/0051494 A1 | 5/2002 | Yamaguchi et al. |
| 2002/0062313 A1 | 5/2002 | Lee et al. |
| 2002/0076112 A1 | 6/2002 | Devara |
| 2002/0087569 A1 | 7/2002 | Fischer et al. |
| 2002/0091665 A1 | 7/2002 | Beek et al. |
| 2002/0093571 A1 | 7/2002 | Hyodo |
| 2002/0094031 A1 | 7/2002 | Ngai et al. |
| 2002/0110193 A1 | 8/2002 | Yoo et al. |
| 2002/0118953 A1 | 8/2002 | Kim |
| 2002/0120498 A1 | 8/2002 | Gordon et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0161462 A1 | 10/2002 | Fay |
| 2002/0180929 A1 | 12/2002 | Tseng et al. |
| 2002/0184159 A1 | 12/2002 | Tadayon et al. |
| 2002/0191112 A1 | 12/2002 | Akiyoshi et al. |
| 2002/0191960 A1 | 12/2002 | Fujinami et al. |
| 2003/0001964 A1 | 1/2003 | Masukura et al. |
| 2003/0002578 A1 | 1/2003 | Tsukagoshi et al. |
| 2003/0005442 A1 | 1/2003 | Brodersen et al. |
| 2003/0035488 A1 | 2/2003 | Barrau |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0142872 A1 | 7/2003 | Koyanagi |
| 2003/0152370 A1 | 8/2003 | Otomo et al. |
| 2003/0165328 A1 | 9/2003 | Grecia |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0216922 A1 | 11/2003 | Gonzales et al. |
| 2003/0231863 A1 | 12/2003 | Eerenberg et al. |
| 2003/0231867 A1 | 12/2003 | Gates et al. |
| 2003/0236836 A1 | 12/2003 | Borthwick |
| 2004/0006701 A1 | 1/2004 | Kresina |
| 2004/0021684 A1 | 2/2004 | Millner |
| 2004/0025180 A1 | 2/2004 | Begeja et al. |
| 2004/0047614 A1 | 3/2004 | Green |
| 2004/0052501 A1 | 3/2004 | Tam |
| 2004/0071453 A1 | 4/2004 | Valderas |
| 2004/0081434 A1 | 4/2004 | Jung et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0143760 A1 | 7/2004 | Alkove et al. |
| 2004/0146276 A1 | 7/2004 | Ogawa |
| 2004/0150747 A1 | 8/2004 | Sita |
| 2004/0208245 A1 | 10/2004 | Macinnis et al. |
| 2004/0217971 A1 | 11/2004 | Kim |
| 2004/0255236 A1 | 12/2004 | Collart |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0089091 A1 | 4/2005 | Kim et al. |
| 2005/0157948 A1 | 7/2005 | Lee |
| 2005/0180641 A1 | 8/2005 | Clark |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0207442 A1 | 9/2005 | van Zoest et al. |
| 2005/0207578 A1 | 9/2005 | Matsuyama et al. |
| 2005/0210145 A1* | 9/2005 | Kim .................. G06F 17/30849 709/231 |
| 2005/0273695 A1 | 12/2005 | Schnurr |
| 2005/0275656 A1 | 12/2005 | Corbin et al. |
| 2006/0015813 A1 | 1/2006 | Chung et al. |
| 2006/0039481 A1* | 2/2006 | Shen ........................ H04N 5/45 375/240.25 |
| 2006/0072672 A1 | 4/2006 | Holcomb et al. |
| 2006/0078301 A1 | 4/2006 | Ikeda et al. |
| 2006/0093320 A1 | 5/2006 | Hallberg et al. |
| 2006/0126717 A1 | 6/2006 | Boyce et al. |
| 2006/0129909 A1 | 6/2006 | Butt et al. |
| 2006/0168639 A1 | 7/2006 | Gan et al. |
| 2006/0173887 A1 | 8/2006 | Breitfeld et al. |
| 2006/0181965 A1 | 8/2006 | Collart |
| 2006/0182139 A1 | 8/2006 | Bugajski et al. |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2007/0005333 A1 | 1/2007 | Setiohardjo et al. |
| 2007/0024706 A1* | 2/2007 | Brannon, Jr. ...... H04N 7/17318 348/142 |
| 2007/0031110 A1 | 2/2007 | Rijckaert |
| 2007/0047901 A1 | 3/2007 | Ando et al. |
| 2007/0053293 A1 | 3/2007 | Mcdonald et al. |
| 2007/0083617 A1 | 4/2007 | Chakrabarti et al. |
| 2007/0086528 A1 | 4/2007 | Mauchly et al. |
| 2007/0140647 A1 | 6/2007 | Kusunoki et al. |
| 2007/0154165 A1 | 7/2007 | Hemmeryckz-Deleersnijder et al. |
| 2007/0168541 A1 | 7/2007 | Gupta et al. |
| 2007/0168542 A1 | 7/2007 | Gupta et al. |
| 2007/0177812 A1 | 8/2007 | Yang et al. |
| 2007/0180125 A1 | 8/2007 | Knowles et al. |
| 2007/0239839 A1 | 10/2007 | Buday et al. |
| 2007/0292107 A1 | 12/2007 | Yahata et al. |
| 2008/0030614 A1 | 2/2008 | Schwab |
| 2008/0052306 A1 | 2/2008 | Wang et al. |
| 2008/0101466 A1 | 5/2008 | Swenson et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0126248 A1 | 5/2008 | Lee et al. |
| 2008/0137736 A1 | 6/2008 | Richardson et al. |
| 2008/0137848 A1 | 6/2008 | Kocher et al. |
| 2008/0192818 A1 | 8/2008 | DiPietro et al. |
| 2008/0196076 A1 | 8/2008 | Shatz et al. |
| 2008/0232456 A1 | 9/2008 | Terashima et al. |
| 2008/0253454 A1* | 10/2008 | Imamura ............ H04N 19/176 375/240.13 |
| 2008/0256105 A1 | 10/2008 | Nogawa et al. |
| 2008/0263354 A1 | 10/2008 | Beuque et al. |
| 2008/0266522 A1 | 10/2008 | Weisgerber |
| 2008/0279535 A1 | 11/2008 | Haque et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0060452 A1 | 3/2009 | Chaudhri |
| 2009/0066839 A1 | 3/2009 | Jung et al. |
| 2009/0116821 A1 | 5/2009 | Shibamiya et al. |
| 2009/0132599 A1 | 5/2009 | Soroushian et al. |
| 2009/0132721 A1 | 5/2009 | Soroushian et al. |
| 2009/0150557 A1 | 6/2009 | Wormley et al. |
| 2009/0169181 A1 | 7/2009 | Priyadarshi et al. |
| 2009/0201988 A1 | 8/2009 | Gazier et al. |
| 2009/0226148 A1 | 9/2009 | Nesvadba et al. |
| 2009/0293116 A1 | 11/2009 | DeMello |
| 2009/0300204 A1 | 12/2009 | Zhang et al. |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2010/0002069 A1 | 1/2010 | Eleftheriadis et al. |

(56) References Cited

U.S. PATENT DOCUMENTS

| | | |
|---|---|---|
| 2010/0040351 A1 | 2/2010 | Toma et al. |
| 2010/0094969 A1 | 4/2010 | Zuckerman et al. |
| 2010/0095121 A1 | 4/2010 | Shetty et al. |
| 2010/0111192 A1 | 5/2010 | Graves |
| 2010/0146055 A1 | 6/2010 | Hannuksela et al. |
| 2010/0158109 A1 | 6/2010 | Dahlby et al. |
| 2010/0189183 A1 | 7/2010 | Gu et al. |
| 2010/0226582 A1 | 9/2010 | Luo et al. |
| 2010/0228795 A1 | 9/2010 | Hahn |
| 2010/0259690 A1 | 10/2010 | Wang et al. |
| 2010/0278271 A1* | 11/2010 | MacInnis ............ H04N 19/172 375/240.18 |
| 2011/0022432 A1 | 1/2011 | Ishida et al. |
| 2011/0055585 A1 | 3/2011 | Lee |
| 2011/0080940 A1 | 4/2011 | Bocharov |
| 2011/0082924 A1 | 4/2011 | Gopalakrishnan |
| 2011/0099594 A1 | 4/2011 | Chen et al. |
| 2011/0126104 A1 | 5/2011 | Woods et al. |
| 2011/0126191 A1 | 5/2011 | Hughes et al. |
| 2011/0129011 A1 | 6/2011 | Cilli et al. |
| 2011/0142415 A1 | 6/2011 | Rhyu |
| 2011/0150100 A1 | 6/2011 | Abadir |
| 2011/0153785 A1 | 6/2011 | Minborg et al. |
| 2011/0164679 A1 | 7/2011 | Satou et al. |
| 2011/0170408 A1 | 7/2011 | Furbeck et al. |
| 2011/0239078 A1 | 9/2011 | Luby et al. |
| 2011/0246659 A1 | 10/2011 | Bouazizi |
| 2011/0268178 A1 | 11/2011 | Park et al. |
| 2011/0280307 A1* | 11/2011 | MacInnis ............... G06T 9/00 375/240.15 |
| 2011/0302319 A1 | 12/2011 | Ha et al. |
| 2011/0305273 A1 | 12/2011 | He et al. |
| 2011/0310982 A1 | 12/2011 | Yang et al. |
| 2011/0314176 A1 | 12/2011 | Frojdh et al. |
| 2011/0314500 A1 | 12/2011 | Gordon |
| 2012/0023251 A1 | 1/2012 | Pyle et al. |
| 2012/0072493 A1 | 3/2012 | Muriello et al. |
| 2012/0093214 A1 | 4/2012 | Urbach |
| 2012/0105279 A1 | 5/2012 | Brown et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1* | 7/2012 | van der Schaar ........................... H04N 21/23439 709/231 |
| 2012/0203766 A1 | 8/2012 | Hörnkvist et al. |
| 2012/0269275 A1 | 10/2012 | Hannuksela |
| 2012/0278496 A1 | 11/2012 | Hsu |
| 2012/0281767 A1* | 11/2012 | Duenas ................ H04N 19/176 375/240.24 |
| 2012/0307883 A1 | 12/2012 | Graves |
| 2013/0007200 A1 | 1/2013 | van der Schaar et al. |
| 2013/0044821 A1 | 2/2013 | Braness et al. |
| 2013/0046902 A1 | 2/2013 | Villegas Nuñez et al. |
| 2013/0051767 A1 | 2/2013 | Soroushian et al. |
| 2013/0051768 A1 | 2/2013 | Soroushian et al. |
| 2013/0054958 A1 | 2/2013 | Braness et al. |
| 2013/0055084 A1 | 2/2013 | Soroushian et al. |
| 2013/0058393 A1 | 3/2013 | Soroushian |
| 2013/0061045 A1 | 3/2013 | Kiefer et al. |
| 2013/0091249 A1 | 4/2013 | McHugh et al. |
| 2013/0095855 A1 | 4/2013 | Bort |
| 2013/0169863 A1 | 7/2013 | Smith |
| 2013/0191754 A1 | 7/2013 | Rose |
| 2013/0196292 A1 | 8/2013 | Brennen et al. |
| 2014/0003501 A1 | 1/2014 | Soroushian et al. |
| 2014/0003523 A1 | 1/2014 | Soroushian et al. |
| 2014/0059243 A1 | 2/2014 | Reisner |
| 2014/0211840 A1 | 7/2014 | Butt et al. |
| 2014/0241421 A1 | 8/2014 | Orton-jay et al. |
| 2014/0250473 A1 | 9/2014 | Braness et al. |
| 2014/0355958 A1 | 12/2014 | Soroushian et al. |
| 2014/0359680 A1 | 12/2014 | Shivadas et al. |
| 2015/0104153 A1 | 4/2015 | Braness et al. |
| 2015/0229695 A1 | 8/2015 | Kim |
| 2016/0073176 A1 | 3/2016 | Phillips et al. |
| 2016/0127440 A1 | 5/2016 | Gordon |
| 2016/0134881 A1 | 5/2016 | Wang et al. |
| 2017/0026445 A1 | 1/2017 | Soroushian et al. |
| 2017/0366833 A1 | 12/2017 | Amidei et al. |
| 2018/0278975 A1 | 9/2018 | Soroushian |
| 2019/0182524 A1 | 6/2019 | Amidei et al. |

FOREIGN PATENT DOCUMENTS

| | | |
|---|---|---|
| CN | 1662952 A | 8/2005 |
| CN | 1723696 | 1/2006 |
| CN | 102138327 A | 7/2011 |
| CN | 103858419 A | 6/2014 |
| CN | 103875248 A | 6/2014 |
| CN | 103875248 B | 9/2018 |
| CN | 108989847 A | 12/2018 |
| CN | 109314784 A | 2/2019 |
| EP | 757484 A2 | 2/1997 |
| EP | 813167 A2 | 12/1997 |
| EP | 1335603 A2 | 8/2003 |
| EP | 1420580 A1 | 5/2004 |
| EP | 1718074 A1 | 11/2006 |
| EP | 2661895 A2 | 11/2013 |
| EP | 3473005 A1 | 4/2019 |
| HK | 1195183 B | 2/2018 |
| JP | 08163488 A | 6/1996 |
| JP | 08287613 A | 11/1996 |
| JP | 11328929 A | 11/1999 |
| JP | 02001043668 A | 2/2001 |
| JP | 2002170363 A | 6/2002 |
| JP | 2002218384 A | 8/2002 |
| JP | 2003250113 A | 9/2003 |
| JP | 2005027153 | 1/2005 |
| JP | 2009508452 A | 2/2009 |
| JP | 2014506430 A | 3/2014 |
| JP | 20165043 A | 1/2016 |
| JP | 2019-526188 A | 9/2019 |
| KR | 100221423 B1 | 9/1999 |
| KR | 2002013664 | 2/2002 |
| KR | 1020020064888 A | 8/2002 |
| KR | 20110051104 A | 5/2011 |
| KR | 20140056317 A | 5/2014 |
| KR | 101928910 B1 | 12/2018 |
| KR | 10-1936142 B1 | 1/2019 |
| KR | 10-1981923 B1 | 5/2019 |
| KR | 10-2020764 B1 | 9/2019 |
| KR | 10-2074148 B1 | 1/2020 |
| KR | 10-2086995 B1 | 3/2020 |
| WO | 1995015660 A1 | 6/1995 |
| WO | 2001031497 A1 | 5/2001 |
| WO | 2001050732 A2 | 7/2001 |
| WO | 2002001880 A1 | 1/2002 |
| WO | 2004054247 A1 | 6/2004 |
| WO | 2004097811 A1 | 11/2004 |
| WO | 2004102571 A1 | 11/2004 |
| WO | 2009065137 A1 | 5/2009 |
| WO | 2010060106 A1 | 5/2010 |
| WO | 2010122447 A1 | 10/2010 |
| WO | 2010150470 A1 | 12/2010 |
| WO | 2011053658 A1 | 5/2011 |
| WO | 2011059291 A2 | 5/2011 |
| WO | 2011087449 A1 | 7/2011 |
| WO | 2011093835 A1 | 8/2011 |
| WO | 2011102791 A1 | 8/2011 |
| WO | 2012094171 A1 | 7/2012 |
| WO | 2012094181 A2 | 7/2012 |
| WO | 2012094189 A1 | 7/2012 |
| WO | 2013033334 A1 | 3/2013 |
| WO | 2013033335 A1 | 3/2013 |
| WO | 2013033458 A2 | 3/2013 |

(56) References Cited

FOREIGN PATENT DOCUMENTS

| WO | 2013033458 A3 | 5/2013 |
| WO | 2017218095 A1 | 12/2017 |

OTHER PUBLICATIONS

International Search Report and Written Opinion for International Application No. PCT/US2012/053052, Report Completed Oct. 25, 2012, dated Nov. 16, 2012, 9 pgs.
International Search Report and Written Opinion for International Application No. PCT/US2012/053223, Report Completed Dec. 7, 2012, dated Mar. 7, 2013, 10 pgs.
International Search Report and Written Opinion for International Application PCT/US2012/053053, search completed Oct. 23, 2012, dated Nov. 13, 2012, 11 pgs.
International Search Report for International Application No. PCT/SE2011/050166, Search completed Mar. 30, 2011, dated Mar. 30, 2011, 5 Pgs.
Extended European Search Report for European Application EP12828956.8, Report Completed Feb. 18, 2015, dated Mar. 2, 2015, 13 Pages.
"Transparent end-to-end packet switched streaming service (PSS); 3GPP file format (3GP) (Release 9)", 3GPP TS 26.244 V9.0.0, Dec. 2009,sections 7.1-7.4, 52 pages.
Fecheyr-Lippens, A., "A Review of HTTP Live Streaming", Jan. 25, 2010, X P002638990, Retrieved from the Internet: URL:http://issuu.com/andruby/docs/http_live_streaming Retrieved on May 24, 2011, 38 Pages.
Watson, Mark, "Input for Dash EE#1 (CMP): Pixel Aspect Ratio", 94. MPEG Meeting, Oct. 11-15, 2010, Guangzhou, Motion Picture Expert Group or ISO/IEC JTC1/SC29/WG11, No. M18498, Oct. 28, 2010, XP030047088, 4 Pages.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
U.S. Appl. No. 13/224,298, "Final Office Action Received", dated May 19, 2014, 26 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Blasiak, "Video Transrating and Transcoding: Overview of Video Transrating and Transcoding Technologies", Ingenient Technologies, TI Developer Conference, Aug. 6-8, 2002, 22 pgs.
Casares et al., "Simplifying Video Editing Using Metadata", DIS2002, 2002, pp. 157-166.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Ding, Li-Fu et al., "Content-Aware Prediction Algorithm Wth Inter-View Mode Decision for Multiview Video Coding", IEEE Transactions on Multimedia, vol. 10, No. 8, Dec. 2008., Dec. 8, 2008, 12 Pages.
Fielding et al., "Hypertext Transfer Protocol—HTTP1.1", Network Working Group, RFC 2616, Jun. 1999, 114 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 2010, 15 pgs.
Griffith, Eric "The Wireless Digital Picture Frame Arrives", Wi-Fi Planet, printed May 4, 2007 from http://www.wi-fiplanet.com/news/article.php/3093141, Oct. 16, 2003, 3 pgs.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
I-O Data, "Innovation of technology arrived", Retrieved from http://www.iodata.com/catalogs/AVLP2DVDLA_Flyer200505.pdf, on May 30, 2013, 2 pgs.
Jeannin, Sylvie et al., "Video Motion Representation for Improved Content Access", IEEE Transactions on Consumer Electronics, vol. 46, No. 3., Aug. 2004, 11 Pages.
Karouia et al., "Video Similarity Measurement Based on Attributed Relational Graph Matching", N.T. Nguyen, R. Katarzyniak (Eds.): New Challenges in Applied Intelligence Technologies, SCI 134, pp. 173-182, 2008., 2008, 10 Pages.
Kim, Seon H. et al., "Design and implementation of geo-tagged video search framework", Journal of Visual Communication and Image Representation, 2010, vol. 21 (2010), pp. 773-786.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.
Lewis, "H.264/MPEG-4 AVC CABAC overview", printed Jun. 24, 2013 from http://www.web.archive.org/web/20121025003926/www.theonlineoasis.co.uk/notes.html, 3 pgs.
Long et al., "Silver: Simplifying Video Editing with Metadata", Demonstrations, CHI 2003: New Horizons, Apr. 5-10, pp. 628-629.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
MSDN, "Adaptive streaming, Expression Studio 2.0", Apr. 23, 2009, 2 pgs.
Nelson, "Arithmetic Coding + Statistical Modeling = Data Compression: Part 1—Arithmetic Coding", Doctor Dobb's Journal, Feb. 1991, USA, pp. 1-12.
Nelson, "Smooth Streaming Deployment Guide", Microsoft Expression Encoder, Aug. 2010, 66 pgs.
Noboru, "Play Fast and Fine Video on Web! codec", Co.9 No. 12, Dec. 1, 2003, pp. 178-179.
Noe, A. "Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, 1-51.

(56) References Cited

OTHER PUBLICATIONS

Noe, Alexander "AVI File Format", http://www.alexander-noe.com/video/documentation/avi.pdf, Dec. 14, 2006, pp. 1-26.
Noe, Alexander "Definitions", Apr. 11, 2006, retrieved from http://www.alexander-noe.com/video/amg/definitions.html on Oct. 16, 2013, 2 pages.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Phamdo, "Theory of Data Compression", printed on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne et al., "Real Time Streaming Protocol (RTSP)", Internet Engineering Task Force, RFC 2326, Apr. 1998, 80 pgs.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 pg.
Unknown, "AVI RIFF File Reference (Direct X 8.1 C++ Archive)", printed from http://msdn.microsoft.com/archive/en- us/dx81_c/directx_cpp/htm/avirifffilereference.asp?fr . . . on Mar. 6, 2006, 7 pgs.
Unknown, "Entropy and Source Coding (Compression)", TCOM 570, Sep. 1999, pp. 1-22.
Unknown, "MPEG-4 Video Encoder: Based on International Standard ISO/IEC 14496-2", Patni Computer Systems, Ltd., Jan. 24, 2007, 15 pgs.
Zambelli, "IIS Smooth Streaming Technical Overview", Microsoft Corporation, Mar. 2009.
Broadq—The Ultimate Home Entertainment Software, printed May 11, 2009 from ittp://web.srchive.org/web/20030401122010/www.broadq.com/qcasttuner/, 1 pg.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Supplementary European Search Report for Application No. EP 04813918, Search Completed Dec. 19, 2012, 3 pgs.
Federal Computer Week, "Tool Speeds Info to Vehicles", Jul. 25, 1999, 5 pgs.
HTTP Live Streaming Overview, Networking & Internet, Apple, Inc., Apr. 1, 2011, 38 pages.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
InformationWeek, "Internet on Wheels", InformationWeek: Front End: Daily Dose, Jul. 20, 1999, Printed on Mar. 26, 2014, 3 pgs.
International Preliminary Report on Patentability for International Application No. PCT/US2008/083816, dated May 18, 2010, 6 pgs.
International Preliminary Report on Patentability for International Application No. PCT/US2012/053052, Completed Mar. 4, 2014, 8 pgs.
International Preliminary Report on Patentability for International Application PCT/US2011/067167, dated Feb. 25, 2014, 8 pgs.
International Search Report and Written Opinion for International Application No. PCT/US09/46588, completed Jul. 13, 2009, dated Jul. 23, 2009, 7 pgs.
International Search Report and Written Opinion for International Application PCT/US2004/041667, completed May 24, 2007, dated Jun. 20, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2017/031114, Search completed Jun. 29, 2017, dated Jul. 19, 2017, 11 Pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Linksys®: "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p.
Microsoft Corporation, "Chapter 8, Multimedia File Formats" 1991, Microsoft Windows Multimedia Programmer's Reference, 3 cover pgs., pp. 8-1 to 8-20.
Microsoft Media Platform: Player Framework, "Microsoft Media Platform: Player Framework v2.5 (formerly Silverlight Media Framework)", May 3, 2011, 2 pages.
Microsoft Media Platform: Player Framework, "Silverlight Media Framework v1.1", Jan. 2010, 2 pages.
Microsoft Windows® XP Media Center Edition 2005, Frequently asked Questions, printed May 4, 2007 from http://www.microsoft.com/windowsxp/mediacenter/evaluation/faq.mspx.
Microsoft Windows® XP Media Center Edition 2005: Features, printed May 9, 2007, from http://www.microsoft.com/windowsxp/mediacenter/evaluation/features.mspx, 4 pgs.
Multiview Video Coding (MVC), ISO/IEC 14496-10, 2008 Amendment, 2 pgs.
Open DML AVI-M-JPEG File Format Subcommittee, "Open DML AVI File Format Extensions", Version 1.02, Feb. 28, 1996, 29 pgs.
PC world.com, Future Gear: PC on the HiFi, and the TV, from http://www.pcworld.com/article/id,108818-page,1/article.html, printed May 4, 2007, from IDG Networks, 2 pgs.
Qtv—About BroadQ, printed May 11, 2009 from http://www.broadq.com/en/about.php, 1 pg.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
"Adaptive HTTP Streaming in PSS-Client Behaviour", S4-AH1129, 3GPP TSG-SA4 Ad-Hoc Meeting, Dec. 14-16, 2009, Paris, France; section 12.6.1.
"Adaptive HTTP Streaming in PSS-Data Formats for HTTP-Streaming excluding MPD", S4-AHI128, 3GPP TSGSA4 Ad-Hoc Meeting, Dec. 14-16, 2009, Paris, France; sections 12.2.1 and 12.2.4.2.1.
"Adaptive HTTP Streaming in PSS-Discussion on Options", S4-AHI130, 3GPP TSG-SA4 Ad-Hoc Meeting, Dec. 14-16, 2009, Paris, France; sections 1, 2.7-2.8, and 2.16-2.19.
"Adaptive Streaming Comparison", Jan. 28, 2010, 5 pgs.

(56) References Cited

OTHER PUBLICATIONS

"Best Practices for Multi-Device Transcoding", Kaltura Open Source Video, Printed on Nov. 27, 2013 from knowledge.kaltura.com/best-practices-multi-device-transcoding, 13 pgs.

"Container format (digital)", printed Aug. 22, 2009 from http://en.wikipedia.org/wiki/Container_format_(digital), 4 pgs.

"DVD-MPeg differences", printed Jul. 2, 2009 from http://dvd.sourceforge.net/dvdinfo/dvdmpeg.html, 1 pg.

"DVD subtitles", sam.zoy.org/writings/dvd/subtitles, dated Jan. 9, 2001, printed Jul. 2, 2009, 4 pgs.

"Final Committee Draft of MPEG-4 streaming text format", International Organisation for Standardisation, Feb. 2004, 22 pgs.

"Fragmented Time Indexing of Representations", S4-AHI126, 3GPP TSG-SA4 Ad-Hoc Meeting, Dec. 14-16, 2009, Paris, France.

"Information Technology—Coding of audio-visual objects—Part 17: Streaming text", International Organisation for Standardisation, Feb. 2004, 22 pgs.

"Information technology—Coding of audio-visual objects—Part 18: Font compression and streaming", ISO/IEC 14496-18, First edition Jul. 1, 2004, 26 pgs.

"Innovation of technology arrived", I-O Data, Nov. 2004, Retrieved from http://www.iodata.com/catalogs/AVLP2DVDLA_Flyer200505.pdf on May 30, 2013, 2 pgs., I-O Data, 2 pgs.

Kiss Players, "Kiss DP-500", retrieved from http://www.kiss-technology.com/?p=dp500 on May 4, 2007, 1 pg.

"MPEG ISO/IEC 13818-1", Information Technology—Generic Coding of Moving Pictures and Associated Audio: Systems, Apr. 25, 1995, 151 pages.

"MPEG-4, Part 14, ISO/IEC 14496-14", Information technology—Coding of audio-visual objects, 18 pgs., Nov. 15, 2003.

"Netflix turns on subtitles for PC, Mac streaming", Yahoo! News, Apr. 21, 2010, Printed on Mar. 26, 2014, 3 pgs.

"OpenDML AVI File Format Extensions", OpenDML AVI M-JPEG File Format Subcommittee, retrieved from www.the-labs.com/Video/odmlff2-avidef.pdf, Sep. 1997, 42 pgs.

"OpenDML AVI File Format Extensions Version 1.02", OpenDML AVI MJPEG File Format Subcommittee. Last revision: Feb. 28, 1996. Reformatting: Sep. 1997.

"QCast Tuner for PS2", printed May 11, 2009 from http://web.archive.org/web/20030210120605/www.divx.com/software/detail.php?ie=39, 2 pgs.

"Smooth Streaming Client", The Official Microsoft IIS Site, Sep. 24, 2010, 4 pages.

International Preliminary Report on Patentability for International Application PCT/US2017/031114, Report dated Dec. 18, 2018, dated Dec. 27, 2018, 7 pgs.

"DVD-Mpeg differences", http://dvd.sourceforge.net/dvdinfo/dvdmpeg.html, printed on Jul. 2, 2009, 1 pg.

European Extended Search Report for EP Application 17813738.6, Search completed Oct. 18, 2019, dated Oct. 24, 2019, 9 pgs.

Chung-Yi Wu et al., "A hierarchical reliability-driven scheduling for cloud video transcoding", International Conference on Machine Learning and Cybernetics Jul. 12, 2015 pp. 456-457.

\* cited by examiner

| Level | Maximum Profile Bitrate |
|---|---|
| Rate9 | 8400 |
| Rate8 | 5300 |
| Rate7 | 3500 |
| Rate6 | 2400 |
| Rate5 | 1750 |
| Rate4 | 1200 |
| Rate3 | 800 |
| Rate2 | 600 |
| Rate1 | 400 |
| Not Allowed | 0 |

FIG. 5

| Video Bitrate | Minimum Adjusted Macroblocks Per Second (Example Profile 1) | Minimum Adjusted Macroblocks Per Second (Encode Profile) |
|---|---|---|
| Rate9 | 217000 | 217000 |
| Rate8 | 162000 | 162000 |
| Rate7 | 125000 | 110000 |
| Rate6 | 102000 | 60000 |
| Rate5 | 60000 | 60000 |
| Rate4 | 41000 | 26000 |
| Rate3 | 26000 | 26000 |
| Rate2 | 26000 | 26000 |
| Rate1 | 15000 | 26000 |
| Encoding Not Allowed | 0 | 0 |

FIG. 6

SYSTEMS AND METHODS FOR ENCODING ALTERNATIVE STREAMS OF VIDEO FOR PLAYBACK ON PLAYBACK DEVICES HAVING PREDETERMINED DISPLAY ASPECT RATIOS AND NETWORK CONNECTION MAXIMUM DATA RATES

CROSS-REFERENCE TO RELATED APPLICATIONS

The current application is a continuation of U.S. patent application Ser. No. 14/464,146 filed Aug. 20, 2014 which is a continuation of U.S. patent application Ser. No. 13/432,521 filed Mar. 28, 2012 which issued on Aug. 26, 2014 as U.S. Pat. No. 8,818,171 which claimed priority to U.S. Provisional Patent Application No. 61/529,204, filed Aug. 30, 2011, the disclosures of which are incorporated herein by reference.

FIELD OF THE INVENTION

The present invention relates to the delivery of multimedia content and more specifically streaming video content encoded at a variety of recommended maximum bitrates optimized for a variety of scaled display resolutions and network connection maximum data rates of playback devices receiving the streams.

BACKGROUND OF THE INVENTION

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

SUMMARY OF THE INVENTION

Systems and methods for adaptive bitrate streaming of alternative streams of video encoded at resolution and sample aspect ratio combinations and maximum bitrates corresponding to the display aspect ratios and network connection maximum data rates of playback devices receiving the streams in accordance with embodiments of the invention are disclosed. In one embodiment of the invention, a source encoder configured to encode a source video stream as a plurality of alternative streams of video for playback on a playback device includes a processor configured by an encoding application to receive multimedia content, where the multimedia content includes source video data having a primary resolution, a primary sample aspect ratio, and a primary frame rate and to encode the source video data as a set of alternative streams of video, where the resolution and sample aspect ratio of at least one of the alternative streams of video are selected to have an aspect ratio that is the same as a predetermined display aspect ratio and at least one of the alternative streams is encoded at a maximum bitrate corresponding to a predetermined network connection maximum data rate.

In another embodiment of the invention, the encoding application further configures the processor to select a resolution, sample aspect ratio, and frame rate for one of the alternative streams, determine a maximum bitrate threshold beyond which higher video quality can be achieved using a higher resolution than the selected resolution at the selected frame rate, and encode the source video stream at the predetermined network connection maximum data rate, when the predetermined network connection maximum data rate is less than the maximum bitrate threshold.

In an additional embodiment of the invention, the source encoder includes an encoding profile, where the encoding profile specifies a plurality of maximum bitrates including a maximum bitrate corresponding to the predetermined network connection maximum data rate, wherein the encoding application further configures the processor to select a resolution, sample aspect ratio and frame rate for each alternative stream, determine a maximum bitrate threshold beyond which higher video quality can be achieved using a higher resolution than the selected resolution at the selected frame rate of each alternative stream, select a maximum bitrate from the profile for each alternative stream, where the selected maximum bitrate is the highest maximum bitrate specified in the profile that is less than the maximum bitrate threshold determined for the alternative stream, and generate each alternative stream by encoding the source video stream at the selected maximum bitrate, selected resolution, sample aspect ratio and frame rate.

In yet another additional embodiment of the invention, the encoding application further configures the processor to determine a maximum bitrate threshold beyond which higher video quality can be achieved using a higher resolution than the selected resolution at the selected frame rate by configuring the processor to determine the maximum bitrate threshold using an adjusted number of macroblocks per second determined based upon the selected resolution, and frame rate.

In still another embodiment of the invention, the encoding application configures the microprocessor to determine the adjusted number of macroblocks per second (AMBPS) as follows:

$$AMBPS=((width*height*FPS)/256)*AdjustmentFactor(FPS),$$

where width and height are the width and height of the encoding resolution, FPS is the frame rate per second for the video data, and AdjustmentFactor(FPS) is a predetermined value based on the FPS of the video data.

In yet still another additional embodiment of the invention, the adjustment factor is selected from the group including:

an AdjustmentFactor(FPS)=1, where FPS=29.97,
an AdjustmentFactor(FPS)=1.1333, where FPS=25, and
an AdjustmentFactor(FPS)=1.1606, where FPS=23.976.

In yet another embodiment of the invention, the encoding application configures the processor to determine the adjustment factor is determined as follows:

$$AdjustmentFactor(FPS)=1+((MaxFPS-FPS)/(MaxFPS*1.25))$$

where MaxFPS is Ceiling (FPS/30)*30.

Still another embodiment of the invention includes encoding a source video stream as a plurality of alternative streams of video for playback on a playback device, including receiving multimedia content using a source encoder, where the multimedia content comprises source video data having a primary resolution, a primary sample aspect ratio, and a primary frame rate and encoding the source video data using the source encoder as a set of alternative streams of video, where encoding the source video includes selecting the resolution and sample aspect ratio of at least one of the alternative streams of video to have an aspect ratio that is the same as the predetermined display aspect ratio and encoding at least one of the alternative streams at a maximum bitrate corresponding to the predetermined network connection maximum data rate.

In yet another additional embodiment of the invention, encoding a source video stream as a plurality of alternative streams of video for playback on a playback device further includes selecting a resolution, sample aspect ratio, and frame rate for one of the alternative streams, determining a maximum bitrate threshold beyond which higher video quality can be achieved using a higher resolution than the selected resolution at the selected frame rate using the source encoder, and encoding the source video stream at the predetermined network connection maximum data rate using the source encoder, when the predetermined network connection maximum data rate is less than the maximum bitrate threshold.

In still another additional embodiment of the invention, encoding a source video stream as a plurality of alternative streams of video for playback on a playback device further includes retrieving an encoding profile using the source encoder, where the encoding profile specifies a plurality of maximum bitrates including a maximum bitrate corresponding to the predetermined network connection maximum data rate, selecting a resolution, sample aspect ratio and frame rate for each alternative stream, determining a maximum bitrate threshold beyond which higher video quality can be achieved using a higher resolution than the selected resolution at the selected frame rate of each alternative stream using the source encoder, selecting a maximum bitrate from the profile for each alternative stream using the source encoder, where the selected maximum bitrate is the highest maximum bitrate specified in the profile that is less than the maximum bitrate threshold determined for the alternative stream, and generating each alternative stream using the source encoder by encoding the source video stream at the selected maximum bitrate, selected resolution, sample aspect ratio and frame rate.

In still yet another additional embodiment of the invention, determining the maximum bitrate threshold using an adjusted number of macroblocks per second determined based upon the selected resolution and frame rate.

In still another embodiment of the invention, determining the adjusted number of macroblocks per second (AMBPS) as follows:

$$AMBPS=((width*height*FPS)/256)*AdjustmentFactor(FPS),$$

where width and height are the width and height of the encoding resolution, FPS is the frame rate per second for the video data, and AdjustmentFactor(FPS) is a predetermined value based on the FPS of the video data.

In yet another additional embodiment of the invention, the adjustment factor is selected from the group comprising:

an AdjustmentFactor(FPS)=1, where FPS=29.97;
an AdjustmentFactor(FPS)=1.1333, where FPS=25; and
an AdjustmentFactor(FPS)=1.1606, where FPS=23.976.

In still yet another embodiment of the invention, the encoding application configures the processor to determine the adjustment factor is determined as follows:

$$AdjustmentFactor(FPS)=1+((MaxFPS-FPS)/(MaxFPS*1.25))$$

where MaxFPS is Ceiling (FPS/30)*30.

Still another embodiment of the invention includes a playback device configured to playback content on a display having a display aspect ratio, including a processor configured to communicate with a memory, where the memory contains a client application, wherein the client application configures the processor to connect to a content distribution system via a network connection, where the network connection has a predetermined maximum likely data rate, obtain an index file from the content distribution system, where the index file describes a plurality of alternative video streams, where at least one of the alternative video streams has the same aspect ratio as the display aspect ratio and is encoded at a maximum bitrate corresponding to the predetermined maximum likely data rate, and request a portion of at least one of the alternative streams using the index file.

Still another embodiment of the invention includes playing back content, including connecting to a content distribution system using a playback device via a network connection, where the network connection has a predetermined maximum likely data rate, obtaining an index file from the content distribution system using the playback device, where the index file describes a plurality of alternative video streams, where at least one of the alternative video streams has the same aspect ratio as the display aspect ratio and is encoded at a maximum bitrate corresponding to the predetermined maximum likely data rate, requesting a portion of at least one of the alternative streams using the playback device and the index file, and playing back the requested portions of the at least one alternative streams using the playback device.

Still another embodiment of the invention includes a machine readable medium containing processor instructions, where execution of the instructions by a processor causes the processor to perform a process including retrieving an encoding profile, where the encoding profile specifies a plurality of maximum bitrates including a maximum bitrate corresponding to the predetermined network connection maximum data rate, and a set of predetermined minimum adjusted macroblocks per second (MAMBPS) corresponding to each one of the maximum bitrates, selecting an encoding bitrate according to the corresponding value of the MAMBPS, selecting a resolution, sample aspect ratio and frame rate for each alternative stream, determining a maximum bitrate threshold beyond which higher video quality can be achieved using a higher resolution than the selected resolution at the selected frame rate of each alternative stream, selecting a maximum bitrate from the profile for each alternative stream, where the selected maximum bitrate corresponds to the MAMBPS that generates the highest positive difference between the AMBPS and the MAMBPS for the alternative stream, and generating each alternative stream by encoding the source video stream at the selected maximum bitrate, selected resolution, sample aspect ratio and frame rate.

In yet another additional embodiment of the invention, if the highest positive number that corresponds to the difference between the AMBPS and MAMBPS is zero, the resolution corresponding to the AMBPS is not allowed by the encoding profile.

Still another embodiment of the invention includes a machine readable medium containing processor instructions, where execution of the instructions by a processor causes the processor to perform a process including connecting to a content distribution system via a network connection, where the network connection has a predetermined maximum likely data rate, obtaining an index file from the content distribution system, where the index file describes a plurality of alternative video streams, where at least one of the alternative video streams has the same aspect ratio as the display aspect ratio and is encoded at a maximum bitrate corresponding to the predetermined maximum likely data rate, requesting a portion of at least one of the alternative streams using the index file, and playing back the requested portions of the at least one alternative streams.

BRIEF DESCRIPTION OF THE DRAWINGS

FIG. 5 is a table illustrating an example of a profile with defined maximum bitrates in accordance with an embodiment of the invention.

FIG. 6 is a table illustrating an example of a set of maximum bitrates and corresponding encoding and decoding minimum adjusted macroblocks per second in accordance with an embodiment of the invention.

DETAILED DISCLOSURE OF THE INVENTION

Figure 1:
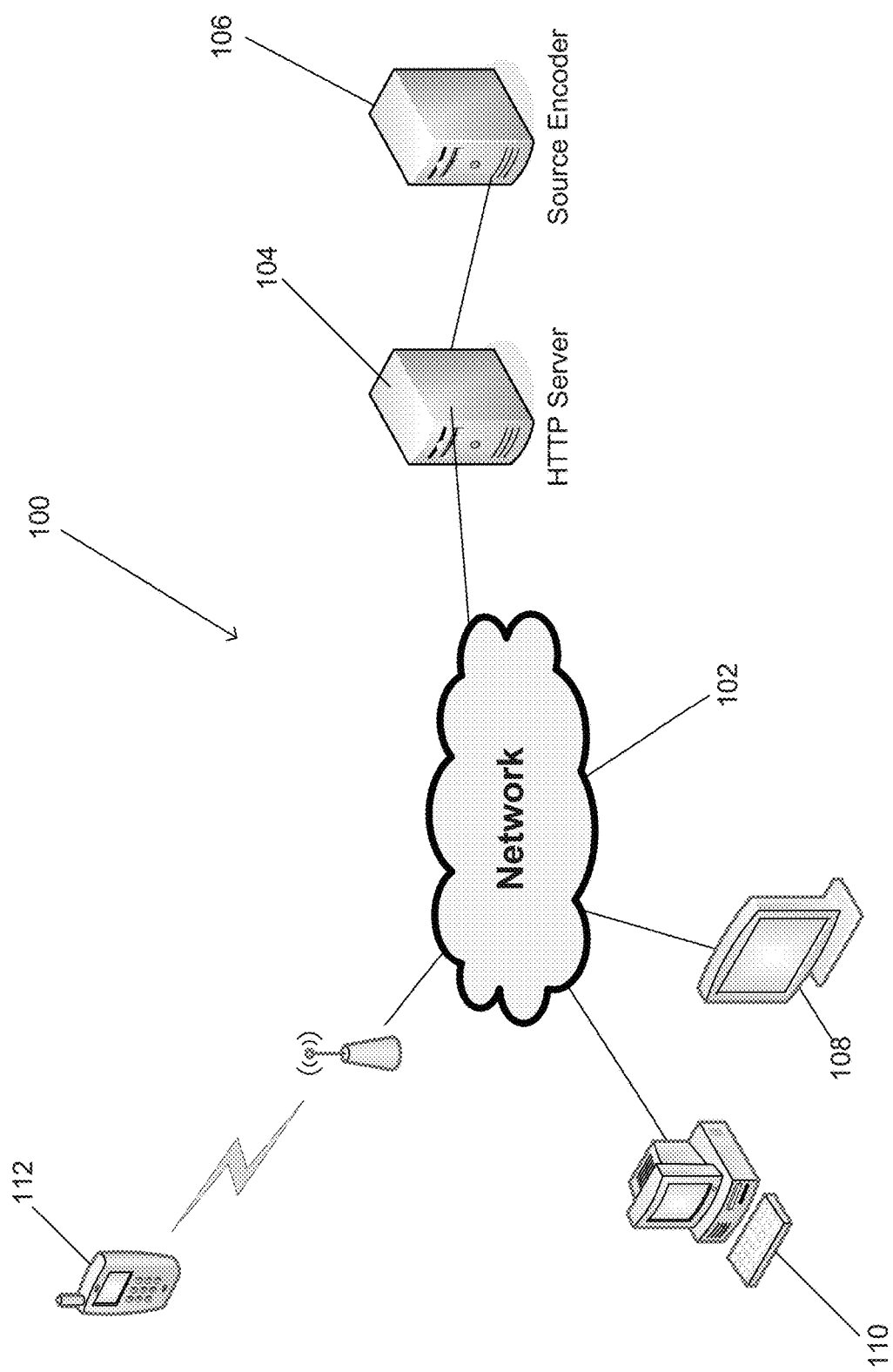
FIG. 1 is a network diagram of an adaptive bitrate streaming system configured to stream video encoded at recommended maximum bitrates in accordance with an embodiment of the invention.

Turning now to the drawings, systems and methods for adaptive bitrate streaming of alternative streams of video encoded at resolution and sample aspect ratio combinations and maximum bitrates corresponding to the display aspect ratios and network connection maximum data rates of playback devices receiving the streams in accordance with embodiments of the invention are illustrated. Adaptive bitrate streaming systems can stream alternative streams of video data encoded at maximum bitrates. In order to provide the highest quality video experience independent of the network data rate, the adaptive bitrate streaming systems switch between the available streams of video data throughout the delivery of the video data according to a variety of factors, including, but not limited to, the available network data rate and video decoder performance. Systems and methods for switching between video streams during playback are disclosed in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the disclosure of which is incorporated by reference herein in its entirety.

The data rate experienced by a playback device during adaptive bitrate streaming typically depends upon the technologies that the playback device utilizes to connect to the Internet and the Internet Service Provider that provides the Internet connection. Playback devices that utilize the same Internet Service Provider often experience similar maximum data rates that can deteriorate from time to time based upon network congestion and/or the processing load of the playback device. In adaptive bitrate streaming systems, the highest quality video that a playback device can receive is typically video encoded at a maximum bitrate equal to the maximum data rate of the network connection of a playback device. Where the video stream is transmitted in conjunction with other streams such as (but not limited to) an audio stream, a subtitle stream and/or a metadata stream, then the effective maximum data rate available for the video stream is equal to the maximum data rate, less the maximum data rates of each of the other streams along with a reserved data rate value that is greater than or equal to zero. An adaptive bitrate streaming system designed to deliver a video stream via the Internet to a variety of playback devices utilizing different Internet Service Providers can identify a set of effective maximum data rates corresponding to the effective maximum data rates likely to be experienced by each of the playback devices. For each effective maximum data rate in the set, the adaptive bitrate streaming system can then encode an alternative video stream having a maximum bitrate corresponding to the effective maximum data rate. In this way, a playback device is likely to be able to stream video encoded at the highest quality that can be supported by the playback device's network connection. In the event that streaming conditions deteriorate, the adaptive bitrate streaming system can stream video encoded at a lower maximum bitrate. Under normal streaming conditions, however, a video stream is available that is encoded to fully utilize the available network connection.

Due to standardization, video sources typically have a display aspect ratio selected from one of a number of common display aspect ratios. As is described in U.S. patent application Ser. No. 13/430,032, the performance of an adaptive bitrate streaming system can be enhanced by encoding each of the alternative streams using resolutions and sample aspect ratios that result in a common aspect ratio across the alternative streams corresponding to the display aspect ratio of the original video source. When a set of alternative video streams is encoded with resolutions and sample aspect ratios that result in an aspect ratio corresponding to the display aspect ratio of the original source, then each pixel of encoded video can be scaled to an integer number of pixels on the display and the playback device can smoothly transition between the streams without the need to resample the streams or add padding rows and/or columns to the decoded video to fit it to the display resolution.

U.S. patent application Ser. No. 13/430,032 also notes that the video quality of a stream encoded with a specific resolution and sample aspect ratio typically does not improve appreciably beyond a specific maximum bitrate threshold. Beyond that threshold, increasing the resolution of the encoded video can increase video quality.

Adaptive bitrate steaming systems in accordance with embodiments of the invention select a set of resolutions and sample aspect ratio combinations that have an aspect ratio corresponding to a specific display aspect ratio and encode an alternative stream at each resolution and sampling aspect ratio combination. The maximum bitrate used to encode each alternative stream is selected based upon a set of predetermined maximum bitrates corresponding to the maximum effective data rates of the network connections of the playback devices within the adaptive bitrate streaming system. The specific maximum bitrate selected for a specific resolution and sample aspect ratio combination may be determined based upon estimating the maximum bitrate threshold for the specific resolution and sample aspect ratio combination beyond which video quality does not appreciably improve and then identifying a maximum bitrate from the set of predetermined maximum bitrates that is the closest maximum bitrate that is less than the threshold. As is discussed further below, the maximum bitrate threshold for a specific resolution and sample aspect ratio combination typically depends upon the frame rate of the video.

By encoding at least one of the alternative streams of video provided by an adaptive bitrate streaming system in accordance with embodiments of the invention using a resolution and sample aspect ratio combination and maximum bitrates corresponding to the aspect ratio of the source content and maximum effective data rate of a playback device, the playback device can stream video encoded to provide the highest quality of video playback capable of being supported by the playback device given its network connection. By encoding lower maximum bitrate streams using resolution and sample aspect ratio combinations having the same aspect ratio as the source content's aspect ratio, the adaptive bitrate streaming system can smoothly transition to streams encoded at lower maximum bitrates when streaming conditions deteriorate. Adaptive bitrate streaming systems configured to stream alternative streams of video encoded at resolution and sample aspect ratio combinations and maximum bitrates corresponding to the display aspect ratios of the source content and network connection maximum effective data rates of the playback devices within the adaptive bitrate streaming system in accordance with embodiments of the invention are discussed further below.

System Overview

An adaptive bitrate streaming system in accordance with an embodiment of the invention is illustrated in FIG. 1. The adaptive bitrate streaming system 100 includes a source encoder 106 configured to encode source video as a number of alternative video streams at resolution and sample aspect ratio combinations and maximum bitrates corresponding to the display aspect ratios of the source content and network connection maximum effective data rates of the playback devices within the adaptive bitrate streaming system. In the illustrated embodiment, the source encoder is a server. In other embodiments, the source encoder can be any processing device including a processor and sufficient resources to perform the transcoding of source media (including but not limited to video, audio, and/or subtitles). The source encoding server 106 typically generates a top level index to a plurality of container files containing the streams, at least a plurality of which are alternative streams. Alternative streams are streams that encode the same content in different ways. In many instances, alternative streams encode media content (such as but not limited to video) at different resolution and sample aspect ratio combinations and different maximum bitrates. In a number of embodiments, the alternative streams are encoded at different frame rates. In a number of embodiments, alternative video streams form sets of alternative video streams encoded with the same aspect ratio corresponding to the display aspect ratio of a set of source content. In many embodiments, the maximum bitrates used in the encoding of each alternative stream in a set of alternative streams is determined based upon the maximum effective data rate typically experienced by different sets of playback devices based upon factors including (but not limited to) the technology and Internet Service Providers the playback devices use to connect to the Internet. The top level index file and the container files are uploaded to a content distribution server 104. Although the source encoding server 106 is described above as generating the top level index file, in many embodiments the top level index file is dynamically generated in response to a request for a specific piece of content by a playback device.

In the illustrated embodiment, playback devices include personal computers 110, CE players 108, and mobile phones 112. In other embodiments, playback devices can include consumer electronics devices such as DVD players, Blu-ray players, televisions, set top boxes, video game consoles, tablets, and other devices that are capable of connecting to a server via HTTP and playing back encoded media. In the illustrated embodiment, a variety of playback devices use HTTP or another appropriate stateless protocol to request portions of a top level index file and the container files via a network 102 such as the Internet. Prior to a playback device performing adaptive bitrate streaming using portions of media from alternative streams contained within the container files, a bandwidth probe can be performed by the playback device to determine available bandwidth. Once the bandwidth probe has been completed, the playback device can utilize data within the top level index including (but not limited to) the maximum bitrate of each of the available streams to determine the initial streams from which to commence requesting portions of encoded media as part of an adaptive streaming process.

Once playback of content from the initial set of streams commences, the playback device utilizes the top level index to perform adaptive bitrate streaming of the content in response to changes in streaming conditions. In many adaptive bitrate streaming systems, the playback device can progress through a series of operational phases in which the playback device responds differently in each phase to changes in the streaming conditions. In a number of embodiments, stability in streaming conditions or improving streaming conditions can result in a transition to a phase in which the playback device assumes stable operating conditions, buffers more content, and is less responsive to fluctuations in streaming conditions. In many embodiments, a deterioration in streaming conditions results in a stream switch to a set of streams utilizing less bandwidth and resulting in the playback device transitioning to a phase in which the playback device assumes unstable operating conditions, buffers less content, and responds rapidly to variations in streaming conditions.

Figure 4:
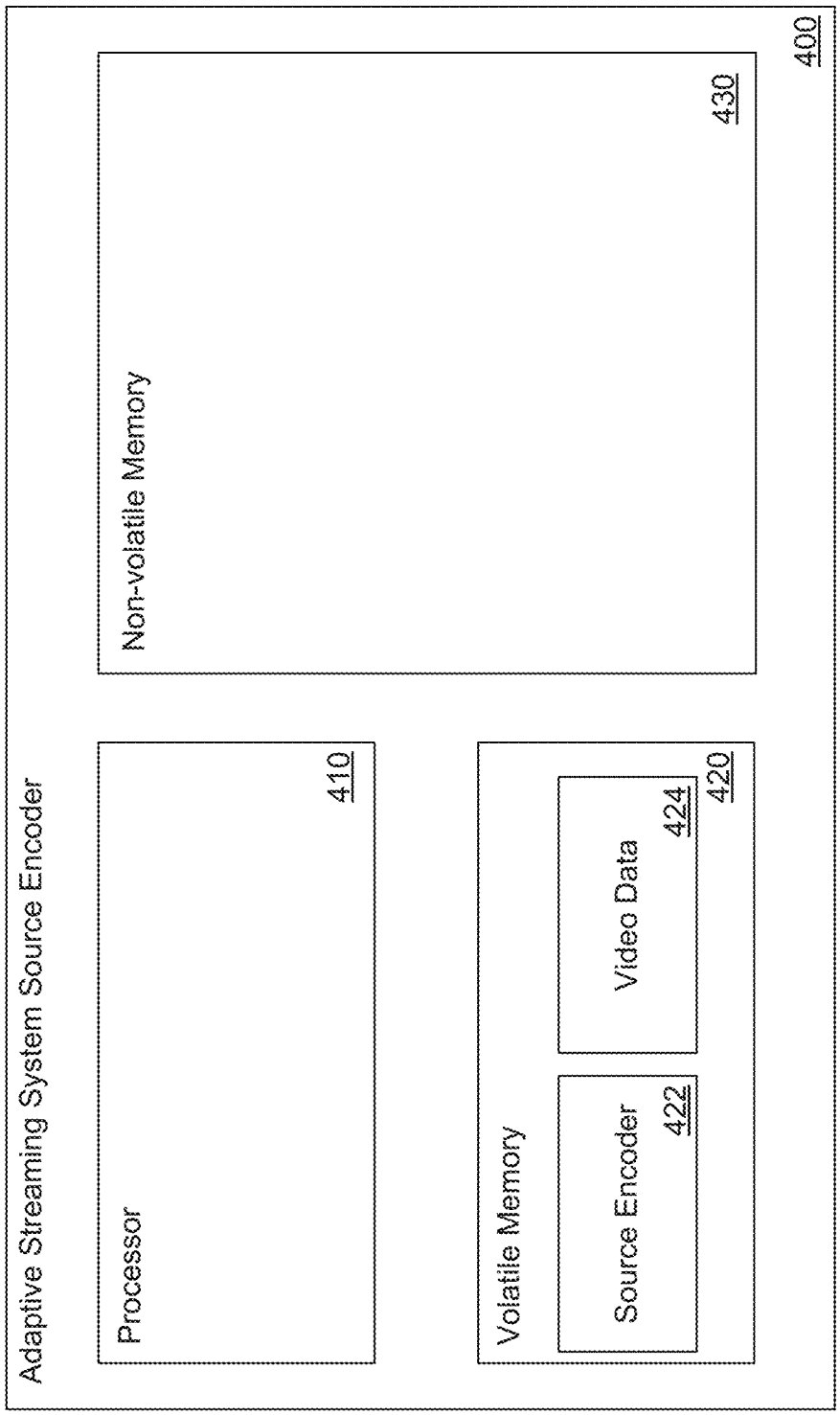
FIG. 4 conceptually illustrates a source encoder configured to encode video data utilizing different video bitrates in accordance with an embodiment of the invention.

In the illustrated embodiment, the adaptive bitrate streaming system includes one or more source encoders capable of encoding a stream of video content into alternative streams of video content encoded at resolution and sample aspect ratio combinations and maximum bitrates corresponding to the display aspect ratios of the source content and network connection maximum effective data rates of the playback devices within the adaptive bitrate streaming system. In many embodiments, the source encoder can be implemented using any device capable of encoding streams of multimedia, where the streams are encoded at different resolutions, sampling rates and/or maximum bitrates. The basic architecture of an adaptive streaming system source encoder in accordance with an embodiment of the invention is illustrated in FIG. 4. The adaptive bitrate streaming system 400 includes a processor 410 in communication with non-volatile memory 430 and volatile memory 420. In the illustrated embodiment, the volatile memory includes a source encoder 422 and alternative streams of video data 424. Although a specific architecture is illustrated in FIG. 4, any of a variety of architectures can be utilized to implement source encoders capable of encoding a stream of video content into alternative streams of video content encoded at resolution and sample aspect ratio combinations and maximum bitrates corresponding to the display aspect ratios of the source content and network connection maximum effective data rates of the playback devices within an adaptive bitrate streaming system in accordance with embodiments of the invention. In many embodiments, the variety of architectures include architectures where the application is located on disk or some other form of storage and is loaded into volatile memory at runtime. Furthermore, any of a variety of system architectures including (but not limited) to the system architecture illustrated in FIG. 1 can be utilized to perform video delivery in accordance with embodiments of the invention. Systems and methods for determining resolution and sample aspect ratios for alternative video streams and the maximum bitrates at which to encode the alternative video streams in accordance with embodiments of the invention are discussed further below.

Determining Maximum Bitrates

Adaptive bitrate streaming systems in accordance with embodiments of the invention select the maximum bitrate at which to encode a video stream having a given resolution and sample aspect ratio based upon the bitrate threshold beyond which video quality no longer appreciably improves and the maximum effective bitrates likely to be experienced by different classes of playback device within the adaptive bitrate streaming system. The set of maximum data rates for different classes of playback devices typically depends upon the requirements of a specific application. Once the set of maximum data rates is determined, the maximum bitrate at which to encode a video stream having a specific resolution, sample aspect ratio and frame rate can be determined by determining the bitrate threshold beyond which video quality no longer appreciably improves and then selecting the maximum data rate that is closest to and less than the bitrate threshold. As noted above, video quality at a given maximum bitrate can be higher at a lower resolution. Beyond a maximum bitrate threshold, however, improvements in video quality at a specific resolution diminish with increases in maximum bitrate. Typically, increasing resolution is the best way to achieve significant improvements in video quality beyond the threshold. The bitrate threshold is largely qualitative and can be defined in any of a variety of ways. Bitrate thresholds can be defined that generally apply to all video streams encoded at a given resolution, sample aspect ratio and frame rate irrespective of the content of the video. In many embodiments, maximum bitrate thresholds are in terms of a maximum number of macroblocks per second or as a maximum bitrate.

Figure 2:
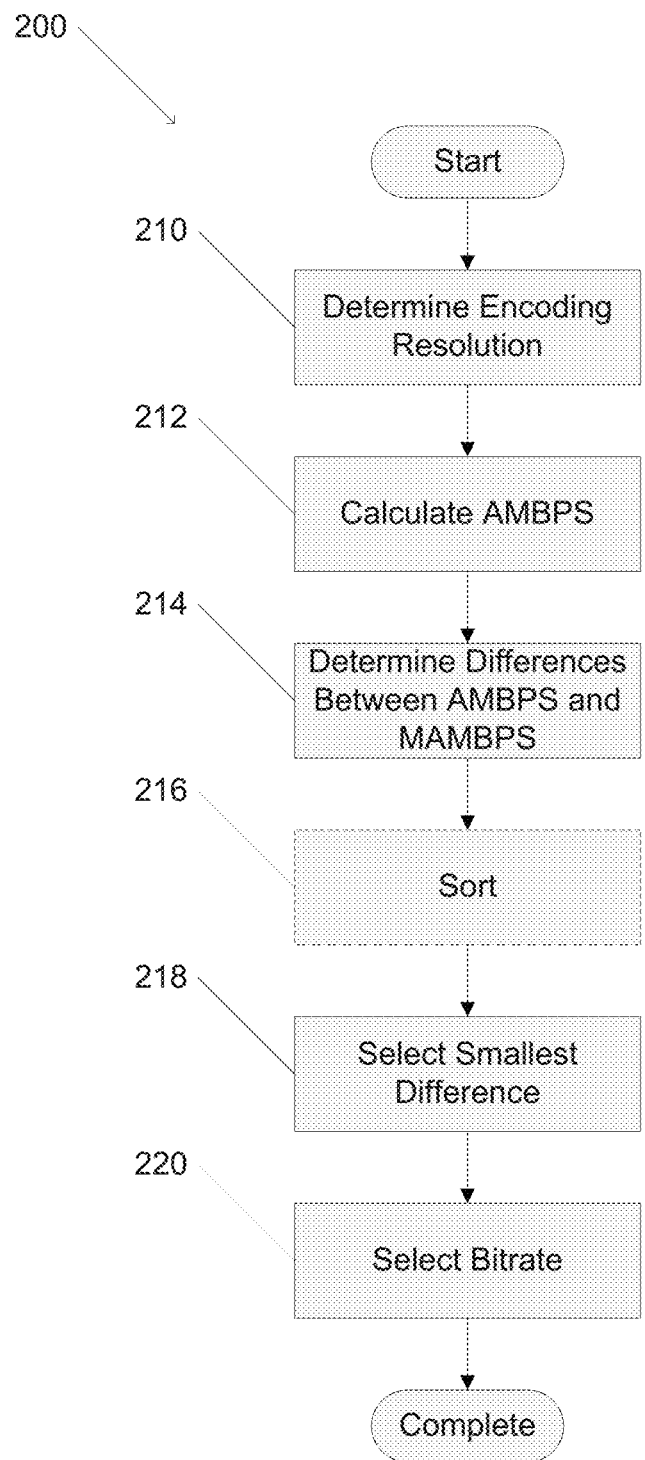
FIG. 2 is a flow chart illustrating a process for determining a recommended bitrate in accordance with an embodiment of the invention.

A generalized process for selecting maximum bitrates at which to encode a plurality of alternative streams using a profile of maximum bitrates corresponding to typical network connection data rates within an adaptive bitrate streaming system in accordance with an embodiment of the invention is illustrated in FIG. 2. The process 200 commences by selecting (210) resolution and sample aspect ratio combinations for the alternative streams. In a number of embodiments, processes similar to those outlined in U.S. patent application Ser. No. 13/430,032 are utilized to select resolution and sample aspect ratio combinations that have the same aspect ratio. The adjusted macroblocks per second (AMBPS) is then calculated (212) for each encoding resolution. In many embodiments of the invention, the following formula may be utilized to calculate the AMBPS for an encoding resolution:

$$AMBPS = ((width*height*FPS)/256)*AdjustmentFactor(FPS),$$

where width and height are the width and height of the encoding resolution,
fps is the frame rate per second for the video data, and
AdjustmentFactor(FPS) is a predetermined value based on the FPS of the video data.

In several embodiments, the following adjustment factors are used for the following common frame rates:
FPS=29.97, AdjustmentFactor(FPS)=1;
FPS=25, AdjustmentFactor(FPS)=1.1333; and
FPS=23.976, AdjustmentFactor(FPS)=1.1606.

In many embodiments, the following general formula may be applied to determine the adjustment factor for any variety of frame rates, including when the frame rate of the video data is greater than 30 FPS:

$$AdjustmentFactor(FPS) = 1 + ((MaxFPS - FPS)/(MaxFPS*1.25)),$$

where FPS is the FPS of the video data and MaxFPS=Ceiling (FPS/30)*30.

Once the AMBPS is calculated, it is compared to the set of minimum adjusted macroblocks per second (MAMBPS) that are associated with maximum bitrates determined based upon the effective maximum data rates that are likely to be experienced by playback devices within the adaptive bitrate streaming system to determine the differences (214) between the calculated AMBPS and the recommended MAMBPS. An example 600 of a set of MAMBPS in accordance with an embodiment of the invention is illustrated in FIG. 6. An example 500 of a set of predetermined bitrates in accordance with an embodiment of the invention is shown in FIG. 5, and the association of MAMBPS and those bitrates in FIG. 6. Once the differences are calculated, in many embodiments the differences are sorted (216). The smallest positive difference between the calculated AMBPS and the MAMBPS is selected (218) (i.e. the highest value of the minimum adjusted macroblocks per second value that is closest to and less than the AMBPS). The bitrate corresponding to the smallest positive difference is selected (220) as the maximum bitrate for the encoding of the alternative video stream at the specified resolution, sample aspect ratio and frame rate. In a number of embodiments, if the bitrate does not have a corresponding smallest positive difference, there is no corresponding encoding bitrate and the resolution and frame rate combination for the video data is not allowed. In other embodiments, if more than one bitrate choice is available for the same MAMBPS, then all of the corresponding bitrates are selected for encoding of the alternative video stream at the specified resolution, sample aspect ratio and frame rate.

In the event that the set of maximum bitrates changes in response to changes in the maximum data rates experienced by the playback device during the streaming of the video data, the maximum bitrates at which the alternative streams are encoded will change accordingly. An example of a set of video encoding bitrates and minimum adjusted macroblocks per second which could be utilized for adaptive bitrate streaming of alternative streams of video encoded at resolution and sample aspect ratio combinations and maximum bitrates corresponding to the display aspect ratios and network connection maximum data rates of playback devices receiving the streams in accordance with embodiments of the invention is illustrated in FIG. 6. As the maximum data rates experienced by the playback device vary during the streaming of video data, alternative streams of video data will be selected. Typically, the alternative streams of video include at least one alternative stream of video data that has a maximum bitrate corresponding to the maximum data rate that is likely to be experienced by the playback device. For example, an adaptive streaming system may be streaming multimedia content to a playback device with video data at a resolution of 1920×1080 at 30 frames per second. This video data may initially have an ideally determined encoded bitrate of 8969 Kbps with calculated adjusted macroblocks per second of 243000. Referring to FIG. 6 and FIG. 5, the column labeled Profile 1 indicates that a group of playback devices have network connections with an anticipated maximum bitrate of 8400 Kbps would have corresponding adjusted macroblocks per second of 217000. Therefore, the video stream at 1920×1080 would have been encoded at 8400 Kbps instead of 8969 Kbps, and selected as the streamed video stream. During streaming, a playback device that typically experiences a maximum bitrate of 8400 Kbps may suffer some network congestion, reducing the maximum available bitrate to 2800 Kbps. In accordance with the above process, the adaptive bitrate streaming system will adjust the video data stream to be streamed by selecting an alternative stream having a maximum bitrate that is less than the data rate of the playback device's network connection. As seen in FIG. 6, the nearest bitrate is 2400, resulting in the adaptive streaming system switching to an alternative stream of video data having a minimum adjusted macroblocks per second of 102000 according to the column labeled Example Profile 1. For example, a stream of video data at a resolution of 1280×720 at 30 frames per second has a calculated adjusted macroblocks per second of 108000; therefore, the adaptive bitrate streaming system will switch to this alternative stream of video data to ensure smooth delivery and playback at the reduced network data rate. Additionally, the video data at resolution of 1280×720 may have been encoded according to the bitrate value of 2400 Kbps, as indicated by the table in FIG. 6. For a system that is based on the streaming characteristics of the column labeled Encode Profile, the video data at resolution of 1280×720 may have been encoded according to the bitrate values of 2400 and 1750 Kbps, because the closest minimum adjusted macroblocks per second value that is less than 108000 is 60000, and this corresponds to the two bitrates which have been specified in FIG. 5. It should be noted, however, that the alternative stream selected will be the stream with the smallest positive difference between the calculated adjusted macroblocks per second of the stream and the adjusted macroblocks per second of the maximum bitrate corresponding to the available data rate.

Although a specific process is described above, there are a variety of methods to determine the resolution and sample aspect ratios of alternative streams of video and the maximum bitrates at which to encode each of the alternative streams of video in accordance with embodiments of the invention. Systems and methods for determining adjustment factors for calculating the bitrate threshold beyond which the video quality of an alternative stream encoded at specific frame rate no longer appreciably improves in accordance with embodiments of the invention are discussed below.

The Adjustment Process

Figure 3:
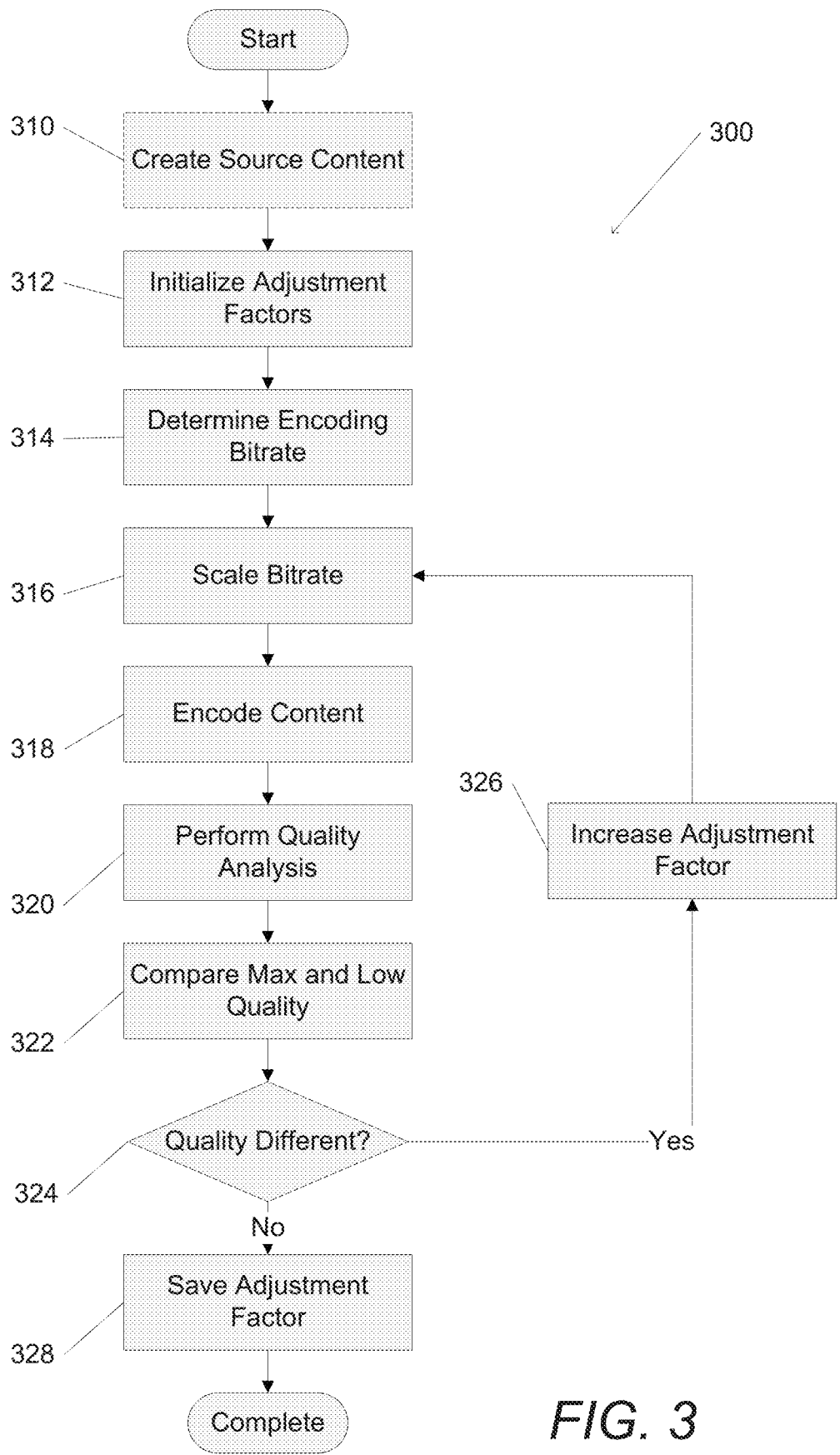
FIG. 3 is a flow chart illustrating a process for determining an adjustment factor in accordance with an embodiment of the invention.

Given video data at a particular frame rate, adjustments factors can be utilized when determining bitrate thresholds for video streams at lower frame-rates due to a quality normalization process between lower and higher frame rates. Frames of video data for content with lower frame rates experience a larger time gap between frames; as a result they may experience larger motion between objects between frames than those of a higher frame-rate video sequence. Additionally, due to the non-linear nature of motion, objects may experience a higher degree of prediction error due to the larger potential time gap between frames in the motion estimation process that is common to many video compression standards which may be utilized to encode video data in accordance with embodiments of the invention. In many video compression standards, the larger motion between objects may ultimately necessitate the allocation of more bits to the encoding of inter-frames in a lower frame rate sequence. Besides the inter-frames, it is also possible that a larger percentage of intra-frames are present in lower frame rate content. Other factors may also involve an adjustment to the linear calculation of AMBPS. A generalized process for determining an adjustment factor in accordance with embodiments of the invention is illustrated in FIG. 3. The process 300 may commence by creating (310) source content, such as video data, with varying frame rates. In a number of embodiments, the source content has been previously created. The adjustment factors are initialized (312) to 1. The encoding bitrate of the source content is determined (314) utilizing the frame rate and resolution of the source content, which may be utilized in a formula which provides an estimate for the encoding bitrate. The encoding bitrate is then scaled (316) by the adjustment factor. The content is then encoded (318). Once the content is encoded, the encoded content is analyzed (320). In several embodiments, the analysis (320) is an objective quality analysis. In a number of embodiments, the analysis (320) is a subjective quality analysis. After the content is analyzed, the quality of the encoded content at the maximum frame rate is compared (322) to the quality of the encoded content at the minimum frame rate. A comparison (324) is then made. If the quality of the encoded content at the minimum frame rate is lower than the quality of the encoded content at the maximum frame rate, the adjustment factor is increased (326) and the process begins anew starting with scaling (316) the encoding bitrate. In some embodiments, the adjustment factor may be decreased if the quality of the encoded content at the minimum frame rate is higher than the quality of the encoded content at the maximum frame rate. If the quality is not different, the adjustment factor is saved (328) for the lower frame rates.

In many embodiments of the invention, the process 300 may be performed for a variety of types of source content, where the adjustment factor is calculated as an average of all the encoding of the source content. In addition, alternative processes can be utilized to calculate adjustment factors for the purpose of determining the maximum bitrates at which to encode specific pieces of content based upon the resolution, and frame rate of the encoded content.

Although the present invention has been described in certain specific aspects, many additional modifications and variations would be apparent to those skilled in the art. It is therefore to be understood that the present invention may be practiced otherwise than specifically described, including playback devices where the set of streaming switching conditions utilized by the playback device are continuously changing, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An adaptive bitrate streaming system comprising:
a set of one or more source encoding servers, wherein each encoding server of the set of encoding servers comprises:
a non-volatile storage containing an encoding application; and
at least one processor;
wherein the encoding applications cause the processors of the encoding servers to encode source content as a plurality of alternative streams of video for playback on a playback device and direct the processors of the encoding servers to:
receive multimedia content, where the multimedia content comprises source video data having a primary resolution, a primary display aspect ratio, and a primary frame rate;
determine a plurality of encoding combinations, wherein each encoding combination comprises one of a plurality of resolutions and one of a plurality of sample aspect ratios, wherein the resolution and the sample aspect ratio of each encoding combination results in a common display aspect ratio corresponding to the primary display aspect ratio of the original source video;
determine a recommended encoding combination for each maximum bitrate of a plurality of maximum bitrates by:
determining an estimated bitrate for each encoding combination based on the resolution of the encoding combination, wherein the estimated bitrate for at least one encoding combination is less than the determined maximum bitrate for the at least one encoding combination; and
selecting an encoding combination with an estimated bitrate less than the maximum bitrate as the determined encoding combination; and
encode the source video data as alternative streams of video for each maximum bitrate of the plurality of maximum bitrates, wherein each alternative stream of video is encoded with the recommended encoding combination for each maximum bitrate, wherein each pixel of encoded video is scaled to an integer number of pixels on a display of the playback device.

2. The adaptive bitrate streaming system of claim 1, wherein each encoding combination further comprises a frame rate, wherein the maximum bitrate for each encoding combination is a maximum bitrate threshold beyond which higher video quality can be achieved using a higher resolution than the resolution at the frame rate of the encoding combination and the recommended bitrate is a maximum predetermined bitrate of a plurality of predetermined bitrates that is not greater than the maximum bitrate threshold.

3. The adaptive bitrate streaming system of claim 2, wherein the encoding applications further direct the processors of the encoding servers to determine the maximum bitrate threshold for each encoding combination using an adjusted number of macroblocks per second determined based upon the resolution and frame rate for the encoding combination.

4. The adaptive bitrate streaming system of claim 1, wherein the playback device can transition between the alternative streams without the need to resample the alternative streams or add padding rows and columns to the decoded video to fit to a display resolution of the display of the playback device.

5. The adaptive bitrate streaming system of claim 2, wherein the the plurality of predetermined bitrates corresponds to maximum effective data rates of network connections of playback devices.

6. The adaptive bitrate streaming system of claim 1, wherein different alternative streams encode the source video data at different frame rates.

7. The adaptive bitrate streaming system of claim 2, wherein the plurality of predetermined bitrates correspond to a predetermined network connection maximum data rate typically experienced by a set of playback devices that use a particular technology and Internet Service Provider to connect to the Internet.

8. The adaptive bitrate streaming system of claim 3, wherein the adjusted number of macroblocks per second is adjusted based on an adjustment factor computed for each frame rate of a plurality of frame rates.

9. The adaptive bitrate streaming system of claim 2, wherein the maximum bitrate threshold for each encoding combination is determined irrespective of the content of the video.

10. A non-transitory machine readable medium containing processor instructions, where execution of the instructions by a processor causes the processor to perform a process comprising:
receive multimedia content, where the multimedia content comprises source video data having a primary resolution, a primary display aspect ratio, and a primary frame rate;
determine a plurality of encoding combinations, wherein each encoding combination comprises one of a plurality of resolutions and one of a plurality of sample aspect ratios, wherein the resolution and the sample aspect ratio of each encoding combination results in a common display aspect ratio corresponding to the primary display aspect ratio of the original source video;
determine a recommended encoding combination for each maximum bitrate of a plurality of maximum bitrates by:
determining an estimated bitrate for each encoding combination based on the resolution of the encoding combination, wherein the estimated bitrate for at least one encoding combination is less than the determined maximum bitrate for the at least one encoding combination; and
selecting an encoding combination with an estimated bitrate less than the maximum bitrate as the determined encoding combination; and
encode the source video data as alternative streams of video for each maximum bitrate of the plurality of maximum bitrates, wherein each alternative stream of video is encoded with the recommended encoding combination for each maximum bitrate, wherein each pixel of encoded video is scaled based on the resolution and the sample aspect ratio of the encoding combination of each alternative stream to an integer number of pixels on a display of the playback device.

11. The non-transitory machine readable medium of claim 10, wherein each encoding combination further comprises a frame rate, wherein the maximum bitrate for each encoding combination is a maximum bitrate threshold beyond which higher video quality can be achieved using a higher resolution than the resolution at the frame rate of the encoding combination and the recommended bitrate is a maximum predetermined bitrate of a plurality of predetermined bitrates that is not greater than the maximum bitrate threshold.

12. The non-transitory machine readable medium of claim 11, wherein execution of the instructions by a processor further causes the processor to determine the maximum bitrate threshold for each encoding combination using an adjusted number of macroblocks per second determined based upon the resolution and frame rate for the encoding combination.

13. The non-transitory machine readable medium of claim 10, wherein the playback device can transition between the alternative streams without the need to resample the alternative streams or add padding rows and columns to the decoded video to fit to a display resolution of the display of the playback device.

14. The non-transitory machine readable medium of claim 11, wherein the plurality of predetermined bitrates corresponds to maximum effective data rates of network connections of playback devices.

15. The non-transitory machine readable medium of claim 10, wherein different alternative streams encode the source video data at different frame rates.

16. The non-transitory machine readable medium of claim 10, wherein the plurality of predetermined bitrates correspond to a predetermined network connection maximum data rate typically experienced by a set of playback devices that use a particular technology and Internet Service Provider to connect to the Internet.

17. The non-transitory machine readable medium of claim 12, wherein the adjusted number of macroblocks per second is adjusted based on an adjustment factor computed for each frame rate of a plurality of frame rates.

18. The non-transitory machine readable medium of claim 11, wherein the maximum bitrate threshold for each encoding combination is determined irrespective of the content of the video.

* * * * *